United States Patent [19]

Dambre

[11] Patent Number: 4,737,392
[45] Date of Patent: Apr. 12, 1988

[54] STEEL WIRE WITH HIGH TENSILE STRENGTH

[75] Inventor: Paul Dambre, Kemmel, Belgium

[73] Assignee: N.V. Bekaert S.A., Zwevegem, Belgium

[21] Appl. No.: 884,678

[22] Filed: Jul. 17, 1986

Related U.S. Application Data

[63] Continuation of Ser. No. 678,477, Dec. 5, 1984, abandoned.

[30] Foreign Application Priority Data

Dec. 5, 1983 [GB] United Kingdom ............... 8332395

[51] Int. Cl.$^4$ .................... C22C 33/00; D02G 3/48
[52] U.S. Cl. .................... 428/36; 428/375; 428/380; 420/8; 420/91; 420/99; 152/451
[58] Field of Search ............... 420/99, 8, 91; 428/36; 152/451; 156/124; 428/382, 383, 375, 380

[56] References Cited

U.S. PATENT DOCUMENTS

| | | | |
|---|---|---|---|
| 2,079,907 | 5/1937 | Hawkridge | 420/99 |
| 2,575,216 | 11/1951 | Giles | 420/99 |
| 3,617,230 | 11/1971 | Richards | 75/123 B |
| 3,984,238 | 10/1976 | Vlasov et al. | 75/123 R |
| 4,011,899 | 3/1977 | Chamberlin | 152/359 |
| 4,020,887 | 5/1977 | Vlasov et al. | 152/359 |
| 4,087,674 | 5/1978 | Kohira et al. | 75/123 R |
| 4,176,513 | 12/1979 | Young et al. | 57/237 |
| 4,268,305 | 5/1981 | Leclerc et al. | 420/99 |
| 4,408,444 | 10/1983 | Baillievier | 57/237 |
| 4,612,792 | 9/1986 | DeBondy et al. | 72/183 |

FOREIGN PATENT DOCUMENTS 0076916 7/1978 Japan .................... 75/123 R

OTHER PUBLICATIONS

Nakamura et al., "The Influence of Phosphourous and Sulfur Contents on the Plastic Deformability of High Carbon Steel Wire", *Wire Journal*, Sep. 1978, pp. 110–113.

*Primary Examiner*—John E. Kittle
*Assistant Examiner*—James J. Seidleck
*Attorney, Agent, or Firm*—Schwartz, Jeffery, Schwaab, Mack, Blumenthal & Evans

[57] ABSTRACT

Bending and torsional ductility of high tensile reinforcement steel wire or cord, especially for rubber products, such as tires, is improved by taking care that the steel compositions that are currently used for such application, have an extra low sulphur content, i.e. below 0.015%, preferably below 0.010%.

21 Claims, No Drawings

STEEL WIRE WITH HIGH TENSILE STRENGTH

This application is a continuation of application Ser. No. 678,477, filed Dec. 5, 1984, now abandoned.

BACKGROUND OF THE INVENTION

The present invention relates to carbon steel wire for high tensile strength applications. The usual composition for this comprises alloying elements (herein defined as those elements that are present in an amount of at least 0.05%) among which the carbon is present in an amount ranging from 0.4 to 1.4%, manganese from 0.1 to 1% and silicon from 0.05 to 1%, the remainder being iron and impurities (herein defined as those elements that are in an amount of less than 0.05%), all percentages of this disclosure being percentages by weight.

By "wire" is meant here any elongated form, irrespective of the cross-sectional shape, the latter being circular in general, but the latter can also have another form, such as rectangular, with a width-to-thickness ratio ranging e.g. from 1 to 20, or any form. In such cases, the diameter of the circle having the same cross-sectional area will be considered here as the "diameter" of the wire.

The high tensile strength will in general have been obtained by cold working a pearlitic steel microstructure, preferably by drawing, but this can also have been obtained e.g. by cold rolling or a combination thereof with a preceding cold drawing operation.

It is known that steel of the composition above must not be cold drawn or worked into wire to such high tensile strength that this would result in unsufficient ductility for supporting bending and torsional loads. In dependence on the diameter, there is a tensile strength limit above which special care must be taken. This limit is higher for thin final diameters than for thick ones. This limit in function of the diameter is given by the formula ($R_m$ being the tensile strength limit in $N/mm^2$ and d being the wire diameter in mm):

$$R_m = 2250 - 1130 \log d \quad (1)$$

which, in a tensile strength-versus-diameter diagram, shows a line, the "line of special care", above which there is the field of high tensile strength.

It is to the wire in this field of high tensile strength that the invention applies. In this field the wires can rather easily pass the current tests on ductility for axial loads, but the problems become more difficult when bending and torsional ductility tests are involved. For the wires having a tensile strength $R_m$ above a given line, called here the "problem-line", given by the formula $$R_m = 2325 - 1130 \log d \quad (2)$$

the percentage of rejections in these bending and torsional tests become excessive. The difficulty is, that among wires that usually successfully passed the ductility test under axial load, there is a part that passes the bending and torsional ductility tests and another part that does not, and that the reasons of this different behaviour are unknown.

This puts a severe limit to the tensile strength to which the wires can be processed, at least for steel wire called for use under non-axial loads, when the wire will have to be deformed into the final product, such as the assembling into a steel cord, or when the wire in the final product is loaded as such, as in springs, bead wire, hose reinforcement wire, steel tire cord, conveyor belt cord and the like.

In order to minimize the rejection figures, and to be able to exceed the above problem line, we have tried in the sense of adding alloying elements, but the random and unpredictable character of rejections in the bending and torsional ductility tests remained. As a consequence, our attempts to minimize the rejection figures have been limited to conducting the patenting heat treatment operation in a careful way for obtaining the finest and most adequate pearlitic microstructure, and by drawing the wire very carefully, by adapting the speed and reduction per drawing-die in order to minimize microstresses and microcracks which might be the reason of this random behaviour in the bending and torsional ductility tests.

SUMMARY OF THE INVENTION

It is an object of the present invention to procure a carbon steel wire of the usual composition given above for high tensile strength applications, processed to a tensile strength above the mentioned line of special care, given by formula (1), showing a better ductility under non-axial loading for a given tensile strength. It is a further object of the present invention to procure such a carbon steel wire, processed to a tensile strength above the problem line, given by formula (2), having sufficient residual bending and torsional ductility in the bending and torsional ductility tests, for use under non-axial loads.

According to the invention, the steel wire is characterized by a sulphur content of less than 0.015%, preferably less than 0.010%.

We have found indeed, after analysis of the various raw materials and wire processing factors which may influence the tensile strength/ductility relationship, that the reason of the different non-axial ductility behaviour of wires that answer the same composition specifications and pass the same high tensile/ductility tests, lies in the fluctuations of the low residual sulphur content.

Up to now, the composition specifications only required a sulphur content not exceeding 0.025% and for drawing wire to a high tensile strength, the mentioned usual compositions herefore in the delivered wire rods for industry had sulphur contents fluctuating somewhere between 0.015 and 0.025% without specifically taking care of the exact composition. The reason is that this residual amount, once it is kept below 0.025%, is of little importance. (But the invention and the explanation hereunder will show that this is only true for axial ductility tests). As a consequence however, the further purification and reduction of the sulphur content was not considered worthwhile, having regard to the sophisticated melting and refining equipment and costly pure raw materials that would be necessary. Instead, the "steel purity" that was optimized related more to the way in which the impurities appeared in the steel: more equal distribution over the volume—finer and more equal distribution of the segregations, etc.

We have found however that this residual sulphur content fluctuating between 0.015 and 0.025% strongly influences in a bad sense the non-axial ductility behaviour, as explained hereunder, and that consequently, steel compositions must be taken with unusually low sulphur content for this application, i.e. below 0.015% preferably below 0.010% and most preferably below 0.008%.

The reason why the residual sulphur content is less important with respect to axial tensile/ductility tests than for non-axial bending/torsion tests is believed to be as follows. During wire drawing, the deformable sulfide inclusions appear to be further elongated too, together with the steel and parallel to the wire axis. In normal axio-symmetric plastic deformation and tensile testing, the fracture occurs at the location of the weakest cross-section. But as these cross-sections are perpendicular to the direction in which these inclusions have been elongated, these cross-sections are about equally strong and the weakening effect of the inclusion is only proportional to the average proportion of inclusion surface to the steel surface in these cross-sections, which is negligible. Under non-axial load however, the fracture planes of which the weakest one must be considered, are not the cross-sections, but rather the fracture planes are of more complicated form, and do no longer lie perpendicular to the axially elongated inclusions, but more in parallel with them. As a consequence, these fracture planes are not equally strong and the weakest one comprises a much higher proportion of inclusion surface to steel surface than the average proportion, and it is this weakest fracture plane that determines the strength. This deleterious effect is even more pronounced with higher local sulfide contents (such as e.g. in wire drawn from rod material with sulphur segregation), so that consequently, besides an extra-low sulphur content, it is preferable to have this sulphur content well distributed over the steel matrix and that any possible inclusions be finely distributed. We found out that even in low-sulphur rods (0.015% S max.) incidental segregation can be a nuisance factor for high-tensile wire production of elevated torsional ductility. Our investigations revealed that this problem depending on rod source and varying with rod manufacturer, is virtually eliminated when specifying an extra-low sulphur content of max. 0.010%, and most preferably max. 0.008% S.

Besides the advantages in the characteristics in the wire as drawn, the extra-low sulphur content also allows an extra-low frequency of rupture during the drawing operation into such wire, owing to the better non-axial ductility of the material that is also exploited during the drawing operation. In cases in which the wire is cold rolled into a strip or wire with rectangular cross-section, surface delamination is also less frequent.

The invention is in particular applicable to steel wire of the composition for rubber reinforcement. By the latter is meant a steel wire of the usual composition above for high tensile strength applications, but in which the carbon, manganese and silicon are more specifically present in the ranges going respectively from 0.6 to 1% (preferably 0.7 to 0.9%), from 0.2 to 0.8% and from 0.1 to 0.4%, the amount of phosphorus not exceeding 0.020%. This wire for rubber reinforcement has a diameter ranging from 0.05 to 3 mm and, in most cases, is covered by a rubber adherable layer, such as brass or any of the organic compounds known for that purpose. Such wire, when processed to very high tensile strength above the problem-like given by formula (2), shows to keep sufficient residual bending and torsional ductility for use in rubber products, i.e. after they have been vulcanized in the rubber, especially in vehicle tires.

The difficulty with usual reinforcement wires in rubber is that the vulcanization provokes a heat ageing effect by which the wires undergo an embrittlement with respect to torsional loads. As a consequence, an extra residual ductility must be reserved for this loss which makes the problems more acute in this application. However, with the wires according to the invention, this loss effect appears to be minimized as will be shown hereinafter.

The invention is even more in particular applicable to steel cord for rubber reinforcement. In this cord, the wires have a diameter ranging from 0.05 to 0.50 mm and have the abovementioned composition for rubber reinforcement and are made rubber-adherable by use of a brass coating or other well-known organic or inorganic coating for that use. Such wires, even when drawn to the very high tensile strength above the problem-line, show to have sufficient resilient ductility to be stranded into cord without excessive ruptures, especially to have sufficient resilient torsional ductility to be stranded in machines where some or all individual wires receive a permanent twist, and then further to leave sufficient residual ductility, after vulcanization, for further use in the rubber tires. In the case of using the latter stranding machines, the microstructure of the twisted wires shows the elongated grains lying in a helicoidal form along the length of the wire. In the steel composition for such application, some elements such as As, Pb and Sn are well-known elements to be avoided and are in general limited to a value below 0.001%, 0.0001% and 0.004% respectively and the total content of scrap elements (i.e. alloying elements such as Cu, Cr and Ni, coming from any possible scrap melt and serving as an indicator of the origin of the steel) are preferably limited to 0.10%.

Such extra-low sulphur pearlitic carbon steel, when used in the diameter range of 0.05 to 3 mm and with the composition for rubber reinforcement, can be drawn to very high tensile strength, i.e. above the problem-line given by formula (2), but will preferably not be processed to an excessively high tensile strength, so that it will still show the well-known ductile fracture mode in the simple torsion and reverse bend test, and not the well-known brittle and delaminating fracture mode. By the simple torsion test is meant the simple torsion testing of steel wire according to international standard ISO 136, in which a length of wire is twisted round its own axis until it breaks. For diameters going from 1 mm (included) to 3 mm, a length of 100 times the diameter is taken and below 1 mm a length of 200 times the diameter. By the reverse bend test is meant the reverse bend testing of steel wire according to international standard ISO 144, in which a length of wire is repeatedly bent through 90° in opposite directions in one plane, over a cylindrical surface of a specified radius R. This radius R is equal to 1.25 mm, 1.75 mm, 2.5 mm, 3.75 mm, 5 mm or 7.5 mm according as the diameter of the wire is respectively 0.5 mm or lower, ranging from 0.5 mm to 0.7 mm included, from 0.7 to 1 mm included, from 1 mm to 1.5 mm included, from 1.5 mm to 2 mm included and from 2 mm to 3 mm included.

The results of the invention are further illustrated here below by a number of examples. In the results $R_m$ means the tensile strength (stress at rupture) in N/mm, $\epsilon_t$ means the percentage total elongation, Z means the percentsage reduction of area after rupture, $N_b$ means the number of reverse bends in the reverse bend test with repeated reverse bends through 90° in opposite directions in one plane over a cylindrical surface of radius R, and $N_t$ means the number of turns in the simple torsion test where a length of 100 times the diameter is twisted around its axis until it breaks.

EXAMPLE 1

Steel wire rods of a diameter of 5.5 mm were used of two different compositions A and B.
A: 0.43% C; 0.62% Mn; 0.23% Si; 0.018% P; 0.006% S.
B: 0.45% C; 0.61% Mn; 0.23% Si; 0.014% P; 0.024% S.

The wire rod properties are summarized in table I, for composition A in the as rolled condition ($A_r$) and in the condition after patenting in the conventional way ($A_p$), and for composition B in the as rolled condition.

TABLE I

| Wire rod | $R_m$ | $E_t$ | Z | $N_b$ |
|---|---|---|---|---|
| $A_r$ | 785 | 12.8 | 65.7 | 9.5 |
| $A_p$ | 905 | 12.0 | 70.4 | 10.2 |
| $B_r$ | 774 | 11.9 | 58.5 | 7.0 |

R = 10 mm.

Direct drawing on a multiple pass machine from wire rod diameter 5.5 to final diameter 1.75 mm was carried out for checking the drawability. Rod A performed very well without any wire fractures, whereas in drawing B a few machine stops were noticed due to sudden wire fractures.

The mechanical properties of the drawn wires are given in Table II:

TABLE II

| Wire rod material | $R_m$ | $E_t$ | Z | N | $N_b$ |
|---|---|---|---|---|---|
| $A_r$ | 1595 | 2.40 | 55.1 | 15.4 | 40 |
| $A_p$ | 1720 | 2.25 | 58.0 | 16.0 | 39 |
| $B_r$ | 1564 | 2.35 | 50.6 | 9.6 | 35 |

R = 5 mm

Further drawing to lower diameters was no problem for material A, which was drawable to a wire diameter of 1 mm and smaller. For material B however, drawability became difficult below 1.5 mm due to the increasing number of wire ruptures, and it was impossible to achieve the limit of 1 mm on a conventional production machine. Below 1.4 mm delamination fractures were observed during the simple torsion test.

The mechanical properties of the wire of material A, as obtained on further drawing below 1.75 mm were as follows:

TABLE III

Mechanical properties of wires after further drawing below 1.75 mm

| Wire rod material | Diameter* | $R_m$ | $E_t$ | Z | $N_b$** | $N_t$ |
|---|---|---|---|---|---|---|
| $A_r$ | 1.35 | 1743 | 2.1 | 53.9 | 12 | 37.5 |
|  | 1.12 | 1980 | 1.2 | 49.7 | 12.4 | 36 |
|  | 1.00 | 2135 | 1.2 | 50.4 | 10.1 | 34 |
| $A_p$ | 1.35 | 1980 | 1.8 | 55.7 | 15 | 42 |
|  | 1.12 | 2251 | 1.0 | 51.2 | 14 | 41 |
|  | 1.00 | 2450 | 0.95 | 51.0 | 11.8 | 33 |

*in mm
**R = 5 mm

From the results, it can be concluded that the steel wire of composition A according to the invention reveals a better drawing performance, a higher achievable strength and better ductility properties, even after heavy total reduction in area, as compared to the wire B of conventional composition. Even when in the proximity of the minimum carbon content for wire for high-tensile applications material A showed to be drawable to a tensile strength level above 2100 N/mm² even without patenting and without delamination fractures, but with a ductile fracture made in bending and torsional testing.

EXAMPLE 2

Steel wires were prepared from three groups of wire rods inside the following composition range: C: 0.80–0.85%; Mn: 0.40–0.70%; Si: 0.20–0.30%. The groups differed in their sulphur content:
A: less than 0.010% S
B: from 0.010 to 0.020% S
C: from 0.020 to 0.035% S The wire rods were firstly drawn to patenting diameter $d_p$, then patented in the conventional way to a fine pearlitic structure with a tensile strength in the range 1350–1400 N/mm², then coated with a thin brass layer of composition 68% Cu–32% Zn for adhesion to rubber, and finally wet drawn to a final diameter d=0.38 mm.

In each group A, B and C, four cases were considered, according to the ratio $r=d_p/d$ which is a measure of the degree of cold working and work hardening.

The obtained mechanical properties (average values) are summarized as follows:

TABLE IV

| | A | | | | B | | | | C | | | |
|---|---|---|---|---|---|---|---|---|---|---|---|---|
| r | $R_m$ | Z | $N_b^{(1)}$ | $N_t$ | $R_m$ | Z | $N_b^{(1)}$ | $N_t$ | $R_m$ | Z | $N_b^{(1)}$ | $N_t$ |
| 4 | 2521 | 48,2 | 28,5 | 56 | 2570 | 50,1 | 29 | 45 | 2472 | 50,1 | 28 | 40 |
| 4,5 | 2825 | 45,7 | 26 | 50 | 2845 | 43,7 | 26 | 42 | 2727 | 43,7 | 22 | 41 |
| 5 | 2982 | 42,5 | 25 | 45 | 2943 | 41,6 | 22 | 35 | 2953 | 41,6 | 19 | 32(3) |
| 5,5 | 3168 | 42,4 | 22,5 | 44 | 3090 | 38,7 | 19 | 33(3) | 3070 | 37 | 17,6 | 28(3) |
| 6 | 3355 | 36,5 | 20 | 34(3) | 3247 | 35,9 | 16 | 30(3) | —(2) | —(2) | —(2) | —(2) |

(1)R = 1.25 mm
(2)brittle ruptures in drawing-die
(3)surface delamination

The results show that as a general rule the tested ductility parameters decrease with increasing tensile strength, but more rapidly in the steel compositions with more sulphur content. More specifically: the torsional ductility limit is already reached in the vicinity of 3000 N/mm² for material C, and such material could not be drawn up to the highest diameter reduction r=6.

The wires of group A displayed the smoothest deformation strain hardening behaviour and achieved the best compromise between the tested ductility parameters and ultimate strength. Only after the highest total reductions in which the strength reached 3400 N/mm², the attained strength became critical, as reflected in the appearance of surface delaminations in the torsion testing.

From these test data it follows that, all other factors being substantially the same, the close control and limitation of the sulphur content is mandatory in order to have the above residual ductility parameters sufficiently high in wire which is drawn to very high tensile strength.

EXAMPLE 3

Four steel wires were tested of about same composition, but differring in sulphur content:

|   | % C | % Si | % Mn | % P | % S |
|---|---|---|---|---|---|
| A | 0.85 | 0.26 | 0.56 | 0.018 | 0.024 |
| B | 0.85 | 0.24 | 0.57 | 0.019 | 0.017 |
| C | 0.85 | 0.25 | 0.56 | 0.016 | 0.012 |
| D | 0.84 | 0.23 | 0.62 | 0.015 | 0.008 |

Wire rods of these compositions were drawn in the conventional way into bead wire of diameter 1.05 mm and tensile strength 2300 N/mm$^2$. The obtained wires were subsequently artificially aged by heating them up to 150° C. and keeping them at this temperature during 1 hour.

The wires were submitted to the simple torsion test before and after ageing, and the percentage of the wires that do not show a ductile fracture mode was determined. The percentages are given in Table V:

TABLE V

|   | A | B | C | D |
|---|---|---|---|---|
| before ageing | 35 | 7 | 0 | 0 |
| after ageing | 90 | 30 | 8 | 2 |

This shows that the steel wires with extra low sulphur composition can much more easily meet the specifications in the torsion test, even after heat ageing.

Analogous results were obtained with the same compositions, drawn to hose wire of a diameter of 0.40 mm and tensile strength of more than 2500 N/mm$^2$, with the difference that, for this small diameter, the wires had in general to be rejected, irrespective of their fracture mode, because no sufficient number of torsions was reached before wire breakage occurred.

The invention can be applied to all sort of tyre cord constructions, either in the bead, or in the carcass or in the belt of the tyre. The constructions can for instance be 3+9 constructions of round wires of a diameter of 0.15, 0.175, 0.22, 0.25 or 0.28 mm diameter, or 2+2 constructions, i.e. constructions according to U.S. Pat. No. 4,408,444 of round wires of a diameter of 0.20, 0.22, 0.25 or 2.28 mm diameter, or single strand constructions 12×1 or 27×1 of round wires of a diameter of 0.15, 0.175, 0.22 and 0.25 mm, all twisted in the same direction with the same pitch, preferably in the so-called compact configuration, i.e., in a cross-sectional figure which is constituted by a number of circles of which the adjacent ones are tangent to each other, when connecting by a line the centre point of each circle with the centre point of the adjacent ones, a network of equilateral triangles is formed.

Typical compositions for use in these applications comprise compositions according to Table VI:

TABLE VI

| % C | % Mn | % Si |
|---|---|---|
| 0.85 | 0.55 | 0.25 |
| 0.77 | 0.55 | 0.22 |
| 0.68 | 0.75 | 0.17 |
| 0.80 | 0.73 | 0.35 |
| 0.72 | 0.60 | 0.20 |

With respect to alloying elements, other than C, Mn and Si, such as Ni, Cr, Co, Mo, Cu, these are limited to amounts at any rate not more than 3%, and preferably to amounts in which they are to be considered as impurities (i.e. less than 0.05%). As to the elements V, Nb, Ti, Al, Ca, Ce, La, Zr, these are limited to amounts to be considered as impurities, preferably to amounts below 0.005%.

I claim:

1. A high strength steel wire having a wire diameter ranging from 0.05 to 0.50 mm and improved resistance to torsional and bending failures, consisting essentially of:

from about 0.4% to about 1.4% by weight carbon;
from about 0.1% to about 1.0% by weight manganese;
between 0.1% and 0.4% by weight silicon;
less than 0.015% by weight sulfur;
less than 0.005% by weight aluminum;
not more than 3% by weight of any element selected from the group consisting of nickel, chromium, cobalt, molybdenum and copper; and
the remainder being iron and incidental impurities;
wherein said wire has a tensile strength in N/mm$^2$ of at least 2250−1130 log d, d being the wire diameter in millimeters.

2. A carbon steel wire according to claim 1, wherein the sulfur content is less than 0.010%.

3. A steel wire according to claim 1, wherein said wire has a diameter of from about 0.05 to about 3.0 mm, a carbon content of from about 0.6% to about 1.0% by weight, and a manganese content of from 0.2 to 0.8% by weight, and wherein said wire includes a rubber adherable coating.

4. A steel wire according to claim 3, wherein said wire contains from about 0.7% to about 0.9% by weight carbon, said wire having a tensile strength in Newtons per square millimeter of at least 2325−1130 log d, in which d is the diameter of the wire in millimeters.

5. A steel cord for reinforcing rubber articles, said cord constructed of a plurality of the wires of claim 3, each of said wires having a diameter of from about 0.05 to about 0.5 mm.

6. A steel wire reinforced rubber article, said article including a steel wire according to claim 3, said article being one of a vehicle tire, a hose and a conveyor belt.

7. A steel cord reinforced rubber article, said article including a steel cord according to claim 5, said article being one of a vehicle tire, a hose and a conveyor belt.

8. A steel wire according to claim 4, said wire further consisting essentially of less than about 0.10% by weight combined of copper, chromium and nickel.

9. A wire according to claim 1, which comprises not more than 0.05% by weight of any element selected from the group consisting of nickel, chromium, cobalt, molybdenum and copper.

10. A steel cord according to claim 5, wherein said rubber adherable coating includes brass.

11. A steel wire according to claim 1, which contains from about 0.014% to about 0.020% by weight phosphorus.

12. A steel cord for reinfocing rubber articles, said cord constructed of a plurality of the wires of claim 4, each of said wires having a diameter of from about 0.05 to about 0.5 mm.

13. A high strength steel wire having a wire diameter ranging from 0.05 to 0.50 mm and improved resistance to torsional and bending failures, consisting essentially of:
   from about 0.80% to about 0.85% by weight carbon;
   from about 0.40% to about 0.70% by weight manganese;
   from about 0.17% to about 0.35% by weight silicon;
   less than 0.010% sulfur;
   less than 0.005% by weight aluminum;
   not more than 3% by weight of any element selected from the group consisting of nickel, chromium, cobalt, molybdenum and copper; and
   the remainder being iron and incidental impurities;
   wherein said wire has a tensile strength of at least $2325-1130 \log d$, in which d is the wire diameter in millimeters.

14. A steel wire according to claim 13, wherein said wire includes a rubber adherable coating.

15. A steel wire according to claim 14, wherein said coating includes brass.

16. A rubber vehicle tire having reinforcing elements including at least one steel cord made from the steel wire of claim 14.

17. A wire according to claim 13, which comprises not more than 0.05% by weight of any element selected from the group consisting of nickel, chromium, cobalt, molybdenum and copper.

18. A high strength steel rubber-reinfocing wire having a wire diameter ranging from 0.05 to 3 mm and improved resistance to torsional and bending failures, consisting essentially of:
   from about 0.4% to about 1.4% by weight carbon;
   from about 0.1% to about 1.0% by weight manganese;
   between 0.1% and 0.4% by weight silicon;
   less than 0.015% by weight sulfur;
   less than 0.005% by weight aluminum;
   not more than 3% by weight of any element selected from the group consisting of nickel, chromium, cobalt, molybdenum and copper; and
   the remainder being iron and incidental impurities;
   wherein said wire has a tensile strength in $N/mm^2$ of at least $2250-1130 \log d$, d being the wire diameter in millimeters, and said wire has a covering layer of rubber adherable material deposited thereon.

19. A steel wire according to claim 18, wherein the sulfur content is less than 0.010% by weight.

20. A steel wire according to claim 19, wherein the carbon content is from about 0.80% to about 0.85% by weight; the manganese content is from about 0.40% to about 0.70% by weight manganese, and the silicon content is from about 0.17% to about 0.35% by weight, and wherein said wire has a tensile strength of at least $2325-1130 \log d$, in which d is the wire diameter in millimeters.

21. A steel wire according to claim 20, which comprises not more than 0.05% by weight of any element selected from the group consisting of nickel, chromium, cobalt, molybdenum and copper.

* * * * *